July 26, 1927.    J. I. HULL    1,637,041
INDUCTION MOTOR
Filed Feb. 9, 1924
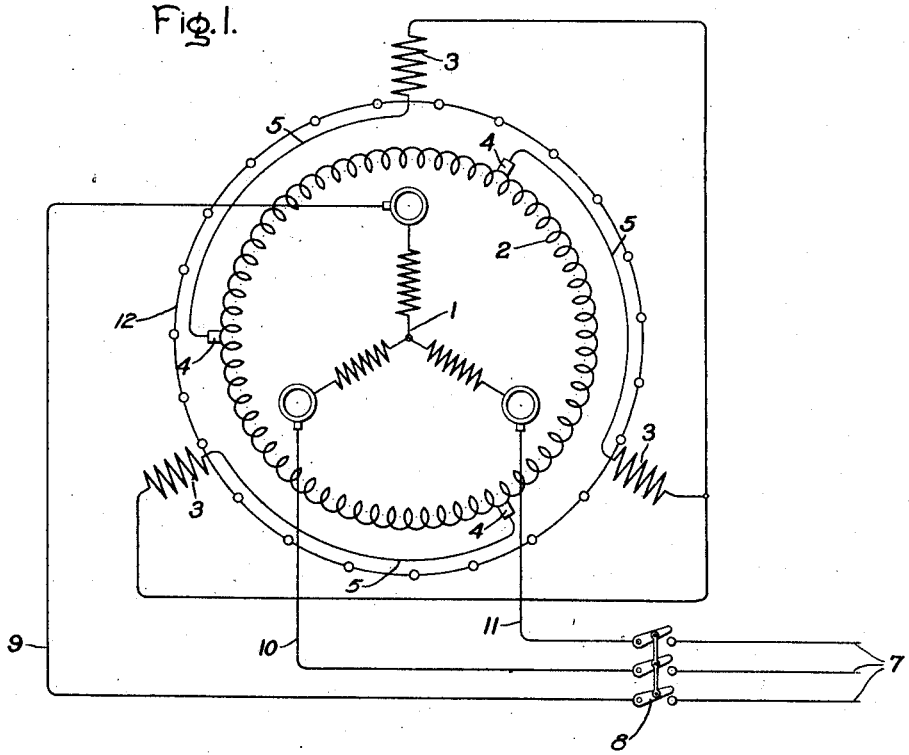
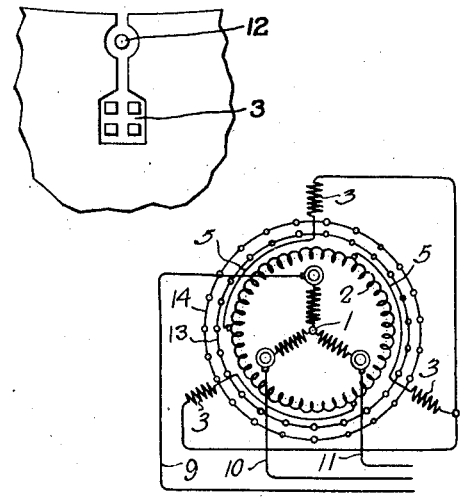
Inventor:
John I. Hull,
by Alexander J. Smith
His Attorney.

Patented July 26, 1927.

1,637,041

UNITED STATES PATENT OFFICE.

JOHN I. HULL, OF SCHENECTADY, NEW YORK, ASSIGNOR TO GENERAL ELECTRIC COMPANY, A CORPORATION OF NEW YORK.

INDUCTION MOTOR.

Application filed February 9, 1924. Serial No. 691,796.

My invention relates to induction motors arranged to operate at unity power factor, and has for its object the provision of means for improving the starting characteristics of such motors in a simple, reliable and effective manner.

It is well known that the current of an induction motor differs in phase from the voltage by which the current is caused to flow due to the fact that this current is required both to produce torque and to supply the magnetizing current of the machine. Thus in the case of the induction motor the primary current lags somewhat behind the voltage impressed on the primary winding of the motor, the amount of lag being comparatively high at light loads and becoming less as the load current of the motor is increased. Since the angle by which the current lags behind the voltage varies with load, a leading component voltage of variable magnitude is required to produce unity power factor at different motor loads. For practical purposes however it is often satisfactory to construct the motor for unity power factor operation under the load conditions at which it is most commonly operated. To this end it has been proposed to provide a commutator winding mounted on the primary core member and arranged to inject into the motor secondary circuit an electromotive force in quadrature with the slip voltage and of a value calculated to supply the magnetizing current of the motor. In accordance with my invention such a motor is provided with means adapted both to improve its starting characteristics and to avoid the commutation difficulties involved in conducting the entire load current through the brushes of the machine.

My invention will be better understood on reference to the following description when considered in connection with the accompanying drawing and its scope will be pointed out in the appended claims.

Referring now to the drawing, Fig. 1 is a diagrammatic showing of a motor in which my invention has been embodied; Fig. 2 is a fragmentary view showing the relation between the phase wound secondary and squirrel cage windings. Figs. 3 and 4 differ from Figs. 1 and 2 in that the single squirrel cage winding is replaced by a double squirrel cage winding.

Fig. 1 shows an induction motor comprising a polyphase primary winding 1 and a commutator exciting winding 2 each illustrated as wound upon the rotor member of the motor. The secondary winding 3 of the motor is placed on the motor stator member and is conductively associated with the commutator winding 2 through brushes 4 and leads 5. The primary winding 1 is arranged to be connected to a source of alternating current 7 through switch 8 and leads 9, 10 and 11. A squirrel cage winding 12 is provided for the purpose of giving the motor a high starting torque, the resistance of this winding being so chosen as to give the most desirable starting characteristic. The winding 12, as indicated by Fig. 2, is preferably placed in peripheral slots near the air gap of the machine while the secondary winding 3 is placed in deeply embedded slots. This loose magnetic coupling between the windings 12 and 3 makes possible great leakage flux between the two windings and facilitates the starting of the motor due to the fact that at starting most of the induced current is forced through the squirrel cage winding. By this arrangement much greater starting torque and lower starting current can be obtained and when the motor is operated at substantially synchronous speed the current will flow mainly through the winding 3 due to the higher resistance of the winding 12. The interaction of the windings 3 and 12 at starting and at normal speed is very similar to the relation between two squirrel cage windings as arranged in the well-known double squirrel cage induction motor. The commutator winding 3 can carry the exciting current just as it would in the case the squirrel cage were not used.

Figs. 3 and 4 show a further modification in which the single squirrel cage winding 12 is replaced by a double squirrel cage winding 13—14 the squirrel cage winding 14 being wound in a set of slots intermediate those in which the windings 3 and 13 are placed. An advantage of this arrangement over that illustrated by Fig. 2 is that the squirrel cage winding 14 can be made of very low relative resistance and so can carry a substantial portion of the working current of the motor without the necessity of passing it through the brushes of the commutator 3.

With the motor arranged as shown in Fig. 1, the interaction of the primary winding 1 and the secondary winding 3 is much the same as in the ordinary phase wound induction motor except that by means of the commutator winding 2 there is injected into the secondary winding 3 an electromotive force of a phase and magnitude required to supply a part or all of the magnetizing current of the machine or even to cause the machine to supply leading current to the line. The most effective position of the brushes 4 is that in which the voltage impressed on secondary winding 3 by the commutator winding 2 is approximately in quadrature with the slip voltage in the case of ordinary loads. Under these conditions the phase of the secondary current is most effectively shifted in a manner to supply the desired percentage of the motor magnetizing current. The motor will operate with a slightly greater value of leading line current at no load than at full load and if adjusted for no wattless current at no load it will take but a slight lagging current at full load.

The exciting winding 2 is inductively related to the primary winding 1. This arrangement is of particular advantage in that the value of the voltage generated in the exciting winding is practically independent of the motor load and makes it possible to supply the magnetizing current of the motor even when operating at zero load.

What I claim as new and desire to secure by Letters Patent of the United States, is:—

1. An induction motor comprising cooperating relatively movable primary and secondary members, a commutated winding on said primary member, said secondary member comprising a slotted magnetic structure carrying a pair of squirrel cage windings and an exciting winding, the latter being excited from said commutated winding, the windings on the secondary being placed at different radial depths in the slots thereof with the exciting winding beneath and separated from each other by intermediate air gaps in the magnetic structure.

2. An induction motor comprising cooperating relatively movable primary and secondary members, a commutated winding on said primary member, said secondary member comprising a slotted magnetic structure carrying a squirrel cage winding and an exciting winding, the latter being excited from the commutated winding on the primary member, the windings on the secondary member being placed at different radial depths in the slots thereof with the exciting winding beneath and spaced apart by intermediate air gaps in the magnetic structure.

3. An induction motor comprising relatively movable primary and secondary windings, a commutator winding immovably related to one of said windings and conductively associated with the other of said windings for controlling the magnetizing current of the motor, and a squirrel cage winding adjacent to and loosely magnetically coupled with said other winding for improving the starting characteristics of said motor.

4. An alternating current motor comprising relatively movable primary and secondary windings and a commutator winding immovably related to said primary winding for controlling the excitation of said motor, characterized by the fact that a short-circuited winding adjacent to and loosely magnetically coupled with said secondary winding is provided for improving the starting characteristics of said motor.

In witness whereof, I have hereunto set my hand this 7th day of February 1924.

JOHN I. HULL.